United States Patent
Nagano (10) Patent No.: US 12,539,571 B2
(45) Date of Patent: Feb. 3, 2026

(54) MACHINE TOOL AND INFORMATION PROCESSING DEVICE

(71) Applicant: DMG MORI CO., LTD., Nara (JP)

(72) Inventor: Toshitaka Nagano, Hokkaido (JP)

(73) Assignee: DMG MORI CO., LTD., Nara (JP)

(*) Notice: Subject to any disclaimer, the term of this patent is extended or adjusted under 35 U.S.C. 154(b) by 534 days.

(21) Appl. No.: 17/973,567

(22) Filed: Oct. 26, 2022

(65) Prior Publication Data
US 2023/0052323 A1    Feb. 16, 2023

Related U.S. Application Data

(63) Continuation of application No. PCT/JP2021/031656, filed on Aug. 30, 2021.

(30) Foreign Application Priority Data

Sep. 2, 2020 (JP) ................. 2020-147397

(51) Int. Cl.
*B23Q 11/04* (2006.01)
*B23Q 5/04* (2006.01)
(Continued)

(52) U.S. Cl.
CPC ............... *B23Q 11/04* (2013.01); *B23Q 5/04* (2013.01); *B23Q 5/58* (2013.01); *B23Q 17/12* (2013.01)

(58) Field of Classification Search
CPC . B23Q 11/04; B23Q 5/04; B23Q 5/58; B23Q 17/12; B23Q 17/2208;
(Continued)

(56) References Cited

U.S. PATENT DOCUMENTS 6,053,886 A * 4/2000 Holland, Jr. ........... A61B 18/00
604/118
2009/0048713 A1    2/2009 Glissmann et al.
(Continued)

FOREIGN PATENT DOCUMENTS

EP    2482156 A1    8/2012
JP    S59-081531 A    5/1984
(Continued)

OTHER PUBLICATIONS

International Search Report issued for the prior international application No. PCT/JP2021/031656 mailed on Nov. 16, 2021.

*Primary Examiner* — Charles Cai
(74) *Attorney, Agent, or Firm* — IP Business Solutions, LLC (57) ABSTRACT

A machine tool includes: a movable body that supports a tool; a feed drive unit that feed-drives the movable body; a numerical control unit that controls the feed drive by the feed drive unit to perform cutting by the tool; an acceleration sensor that is provided on the movable body and detects acceleration of the movable body; and a command unit that outputs a stop command to stop driving of the feed drive unit to the numerical control unit when the acceleration of the movable body exceeds a threshold value set in advance on the basis of an output of the acceleration sensor. The command unit sets the threshold value to a first threshold value in a cutting control state, and sets the threshold value to a second threshold value lower than the first threshold value in a feed control in a non-cutting control state.

6 Claims, 7 Drawing Sheets

(51) Int. Cl.
*B23Q 5/58* (2006.01)
*B23Q 17/12* (2006.01)

(58) Field of Classification Search
CPC ............ B23Q 11/0085; B23Q 17/0971; G05B 2219/37388; G05B 2219/49141; G05B 19/406
See application file for complete search history.

(56) References Cited

U.S. PATENT DOCUMENTS

| | | | |
|---|---|---|---|
| 2012/0221137 A1* | 8/2012 | Kettemer | ............... B23Q 17/12 700/108 |
| 2015/0352679 A1 | 12/2015 | Yamamoto et al. | |
| 2017/0074899 A1* | 3/2017 | Oouchi | ............... G01P 15/0802 |
| 2019/0005413 A1 | 1/2019 | Sato | |
| 2019/0210176 A1* | 7/2019 | Yamamoto | ......... G05B 13/0265 |
| 2022/0260440 A1* | 8/2022 | Goyal | ....................... B25F 5/00 |

FOREIGN PATENT DOCUMENTS

| | | |
|---|---|---|
| JP | H08-323585 A | 12/1996 |
| JP | H10-143216 A | 5/1998 |
| JP | 2014-172107 A | 9/2014 |
| JP | 2017-021472 A | 1/2017 |
| JP | 2017-054330 A | 3/2017 |
| JP | 6900564 B | 6/2021 |

* cited by examiner

| PLC INPUT | | AUTOMATIC OPERATION | | MANUAL OPERATION | | |
|---|---|---|---|---|---|---|
| | MODE | MEMORY OPERATION/MDI | | JOG | | PULSE FEED |
| | RAPID TRAVERSE IN PROGRESS SIGNAL | 0 | 1 | 0 | 1 | – |
| STATE | | CUTTING FEED | RAPID TRAVERSE | JOG FEED | JOG RAPID TRAVERSE | PULSE FEED |
| THRESHOLD VALUE | | G1 | G2 | G3 | G4 | G5 |

FIG.6

MACHINE TOOL AND INFORMATION PROCESSING DEVICE

BACKGROUND OF INVENTION

1. Field

The present invention relates to a collision detection technique for a movable body in a machine tool.

2. Description of Related Art

Examples of machine tools include a turning center that moves a tool relative to a rotating workpiece, a machining center that moves a rotating tool relative to a workpiece, and a combined machine having these functions in combination. In such a machine tool, if a movable part collides with another movable part or with a workpiece, normal machining cannot be performed thereafter. Therefore, it is necessary to monitor occurrence of a collision, and when a collision is detected, issue an alarm and stop the machine operation, replace a damaged tool with a normal tool as necessary, and the like to restore the machine.

For example, a technique has been proposed which measures a torque of a servomotor driving a movable part and detects a collision to stop the machine operation when the torque exceeds a predetermined threshold value (hereinafter also referred to as a "torque threshold value"), (Patent Literature 1 and Patent Literature 2). More specifically, the electric current value of the servomotor is monitored as a value reflecting the torque. A collision is detected when the electric current value exceeds a threshold value corresponding to the torque threshold value (hereinafter also referred to as an "electric current threshold value").

RELATED ART LIST

Patent Literature 1: JP H10-143216 A
Patent Literature 2: JP 2017-021472 A

Mechanical collision in a machine tool might occur when moving a movable part, and the load torque at the time of moving the tool differs greatly between a cutting control state and a rapid traverse state. Here, the "cutting control state" means a state in which the tool is moved at a feedrate for cutting operation. Specifically, this includes a state in which the tool is brought into contact with the workpiece to perform cutting, and a state in which the tool is moved at a low rate from a position close to the workpiece (cutting control start position) to a contact position. The "rapid traverse state" means a state in which the tool is moved at a feedrate for non-cutting operation. Specifically, this includes a state in which the tool is moved at a high rate from a predetermined origin or an arbitrary position to a cutting control start position or a tool replacement position. This state is provided for reducing the operation time of a machine tool. Hereinafter, in order to appropriately distinguish the movement of a tool, the movement of the tool in the cutting control state will be referred to as "cutting feed", and the movement of the tool in the rapid traverse state (non-cutting control state) will be referred to as "rapid traverse". The load torque in the rapid traverse is larger than the load torque in the cutting feed.

Therefore, if the torque threshold value is set on the basis of the load torque in the cutting feed, the load torque in the rapid traverse might exceed the torque threshold value, and in this case, a collision might be erroneously detected. Conversely, if the torque threshold value is set high on the basis of the load torque in the rapid traverse, a collision occurred during the cutting control (at low rate) might not be detected.

In addition, when the weight of the movable portion is changed depending on a mounted tool such as a spindle head or a tool rest, the load torque also changes according to the change of the weight. Therefore, the torque threshold value must be changed each time a tool is mounted, which is cumbersome.

SUMMARY OF INVENTION

An aspect of the present invention is a machine tool. This machine tool includes: a movable body that supports a tool; a feed drive unit that feed-drives the movable body; a numerical control unit that controls the feed drive by the feed drive unit to perform cutting by the tool; an acceleration sensor that is provided on the movable body and detects acceleration of the movable body; and a command unit that outputs a stop command to stop driving of the feed drive unit to the numerical control unit when the acceleration of the movable body exceeds a threshold value set in advance on the basis of an output of the acceleration sensor. The command unit sets a first threshold value as the threshold value in a cutting control state, and sets a second threshold value lower than the first threshold value in a feed control in a non-cutting control state.

Another aspect of the present invention is an information processing device. This information processing device is provided in a machine tool including: a movable body that supports a tool; a feed drive unit that feed-drives the movable body; a numerical control unit that controls the feed drive by the feed drive unit to perform cutting by the tool; and an acceleration sensor that detects acceleration of the movable body. This information processing device includes: a state monitoring unit that monitors the control state of the numerical control unit; a stop command unit that outputs a stop command to stop driving of the feed drive unit to the numerical control unit when the acceleration of the movable body exceeds a threshold value set in advance on the basis of an output of the acceleration sensor; and a threshold value setting unit that changes the setting of the threshold value according to the control state. The threshold value setting unit sets a first threshold value as the threshold value in a cutting control state, and sets a second threshold value lower than the first threshold value in a feed control in a non-cutting control state.

According to the present invention, a collision of a movable body in a machine tool can be appropriately detected.

DETAILED DESCRIPTION

Hereinafter, an embodiment of the present invention will be described with reference to the drawings. The machine tool of this embodiment is configured as a turning center-based multitasking machine capable of milling and turning.

Figure 1:
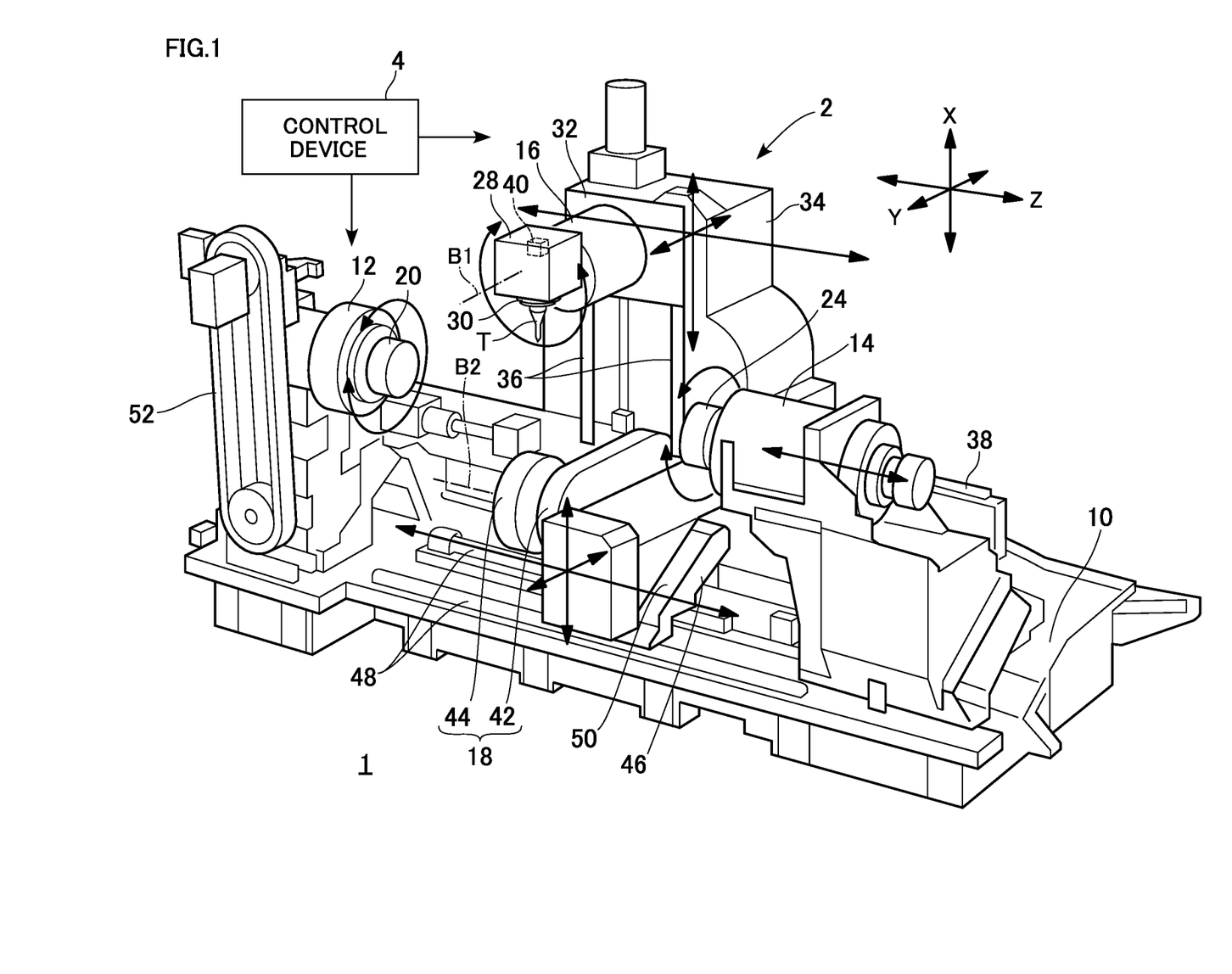
FIG. 1 is a perspective view illustrating a schematic configuration of a machine tool according to an embodiment.

FIG. 1 is a perspective view illustrating a schematic configuration of a machine tool according to an embodiment.

As shown, the up-down direction, the front-back direction, and the right-left direction of the machine tool 1 as viewed from the front will be referred to as an X-axis direction, a Y-axis direction, and a Z-axis direction, respectively.

The machine tool 1 includes a machining device 2 and a control device 4. A device housing is provided so as to cover the machining device 2, and an operation panel is provided on the front surface thereof, but these are not shown in the figures.

The machining device 2 is constituted by mounting a first headstock 12, a second headstock 14, a tool spindle 16, and a tool rest 18, among others on a bed 10. The first headstock 12 has a first spindle 20 having a tip to which a first chuck (not shown) is attached. The second headstock 14 has a second spindle 24 having a tip to which a second chuck (not shown) is attached. The second spindle 24 can be replaced with a tailstock (not shown) as necessary.

The first spindle 20 and the second spindle 24 are disposed so as to face each other coaxially in the Z-axis direction. Each of the first headstock 12 and the second headstock 14 incorporates a spindle motor. The first spindle 20 and the second spindle 24 are rotationally driven about their respective axes. The second headstock 14 is movable in the Z-axis direction, so that the interval between the first spindle 20 and the second spindle 24 can be adjusted appropriately.

The tool spindle 16 has a rotary shaft extending in the Y-axis direction and rotatably supports a spindle head 28. The spindle head 28 is provided with a tool holding portion 30. A tool T for performing milling is attachable to the tool holding portion 30. The tool spindle 16 is supported movably in the Y-axis direction by a saddle 32. The saddle 32 is movable (upward and downward) in the X-axis direction by a movable column 34. The movable column 34 is provided with a guide rail 36 for guiding the movement of the saddle 32. The movable column 34 is supported movably in the Z-axis direction along a guide rail 38 on the bed 10.

The tool spindle 16, the saddle 32, and the movable column 34 are moved by a feed mechanism (not shown) and a servo motor driving the feed mechanism. The feed mechanism is a screw feed mechanism that uses, e.g., a ball screw. The servomotor functions as a "feed drive unit". The spindle head 28 is movable in the X-, Y-, and Z-axis directions together with the tool spindle 16, and is rotatable with respect to the tool spindle 16 about an axis B1 parallel to the Y-axis. The spindle head 28 and the tool spindle 16 function as a "movable body". The spindle head 28 incorporates an acceleration sensor 40 for detecting acceleration in the X-axis direction and the Y-axis direction. The acceleration sensor 40 is used for detecting a collision of the tool T and the spindle head 28, details of which will be described later. The tool rest 18 includes a turret base 42 and a turret 44. The turret base 42 has a rotary shaft extending in the Z-axis direction and rotatably supports the turret 44. The turret base 42 is provided with a spindle motor for rotationally driving the turret 44. The turret 44 is provided with a plurality of clamping/unclamping mechanisms (not shown) along its peripheral edge. A plurality of tools (not shown) of different types can be attached and detached by these clamping/unclamping mechanisms.

The turret base 42 is supported by a saddle 46. The saddle 46 is supported movably in the Z-axis direction along a guide rail 48 on the bed 10. The saddle 46 has an inclined surface 50 inclined with respect to the bed 10, and supports the turret base 42 movably in the X- and Y-axis directions along the inclined surface 50. The tool rest 18 and the saddle 46 are moved by a feed mechanism (not shown) and a servo motor driving the feed mechanism. The feed mechanism is a screw feed mechanism that uses, e.g., a ball screw. The servo motor functions as a "second feed drive unit".

With such a configuration, the turret 44 is movable in the X-, Y-, and Z-axis directions. The turret 44 is rotatable about an axis B2 parallel to the Z-axis, which makes it possible to switch tools used for machining. That is, the turret 44 is moved in the orthogonal three axial directions relative to the workpiece supported by one or both of the first spindle 20 and the second spindle 24, and the workpiece can be cut or turned by a tool.

A tool magazine 52 is provided on the bed 10 adjacent to the first headstock 12. The tool magazine 52 accommodates a plurality of types of tools. By moving the saddle 46 in the Z-axis direction, tools can be exchanged between the turret 44 and the tool magazine 52. In other words, the machine tool 1 is provided with a so-called automatic tool changer (ATC), the description of which is omitted herein.

Figure 2:
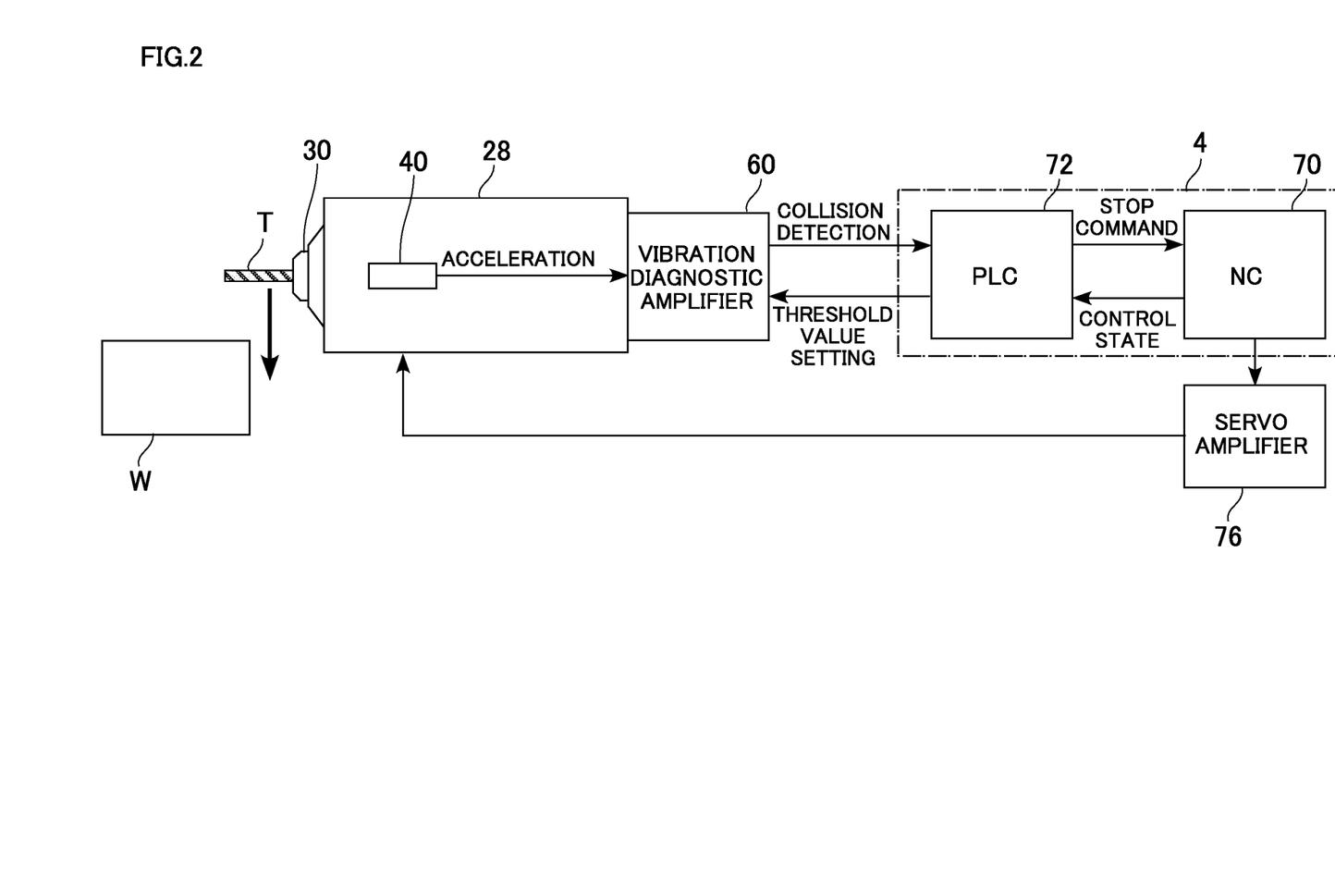
FIG. 2 is a diagram schematically illustrating an electrical configuration of a functional portion related to collision detection of a movable body.

FIG. 2 is a diagram schematically illustrating an electrical configuration of a functional portion related to collision detection of a movable body.

As described above, the spindle head 28 incorporates the acceleration sensor 40. The acceleration sensor 40 is a sensor for detecting acceleration in the directions of two axes (X-axis and Y-axis). The acceleration of the spindle head 28 is calculated on the basis of a composite vector of the acceleration of the two axes. In this embodiment, acceleration in the Z-axis direction is not taken into account. The acceleration (more specifically, an electric current value indicating acceleration) detected by the acceleration sensor 40 is supplied to a vibration diagnostic amplifier 60.

The vibration diagnostic amplifier 60 is a device for monitoring vibration of machines and facilities, and is provided in the spindle head 28 (movable body) in this embodiment. The vibration diagnostic amplifier 60 amplifies the electric current signal detected by the acceleration sensor 40 and determines whether the acceleration of the spindle head 28 exceeds a threshold value set in advance. When the acceleration of the spindle head 28 (movable body) reaches a value indicating a collision, the vibration diagnostic amplifier 60 outputs a collision detection signal indicating this to the control device 4. The vibration diagnostic amplifier 60 stores a threshold value (described later in detail) for determining the presence or absence of a collision, and outputs a collision detection signal when the acceleration acquired from the acceleration sensor 40 exceeds the threshold value. This threshold value can be externally set and changed.

The control device 4 includes a numerical controller (NC) 70 and a programmable logic controller (PLC) 72. The control device 4 is provided on a control panel of the machining device 2. The PLC 72 executes processing according to predetermined control logic on the basis of data and signals received from the NC 70 and various sensors. With respect to the collision monitoring described above, the PLC 72 outputs a stop command to the NC 70 upon receiving a collision detection signal from the vibration diagnostic amplifier 60. Further, in accordance with the information sent from the NC 70, i.e., the control state of the machine tool 1, an instruction to change the setting of the threshold value is output to the vibration diagnostic amplifier 60. Details of this threshold value changing process will be described later.

The NC 70 controls an actuator such as a motor according to a machining program (NC program) generated manually or automatically. When milling a workpiece W, the NC 70 drives the servo motor through a servo amplifier 76 to feed-drive the spindle head 28. The spindle motor is driven to rotate the tool holding portion 30. With respect to the collision monitoring described above, the NC 70 stops driving the entire machine tool 1 upon receiving a stop command from the PLC 72. Specifically, the NC 70 stops the feed driving of the tool spindle 16, the saddle 32, and the movable column 34, and then stops the rotation of the tool holding portion 30.

For turning of the workpiece W, the NC 70 drives the spindle motor to rotate one or both of the first spindle 20 and the second spindle 24. Subsequently, the NC 70 drives the servomotor to feed-drive the turret 44 to machine the workpiece.

Figure 3:
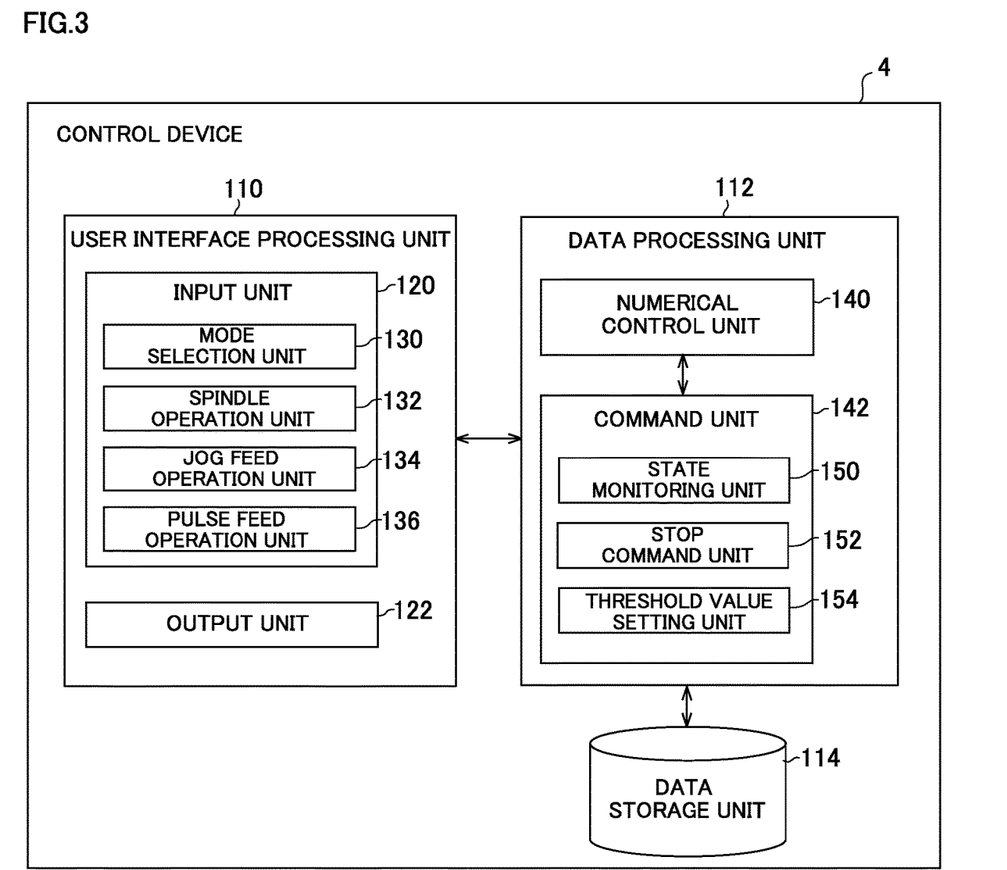
FIG. 3 is a functional block diagram of a control device.

FIG. 3 is a functional block diagram of the control device 4.

The components of the control device 4 is implemented by hardware including computing units such as central processing units (CPUs) and various computer processors, a storage device such as memories and storages, and wired or wireless communication lines that connect these units and devices, and software that is stored in the storage device and supplies processing instructions to the computing units. Computer programs may be constituted by device drivers, operating systems, various application programs on upper layers thereof, and a library that provides common functions to these programs. Each of the blocks described below represents a functional block, not a hardware block.

The control device 4 includes a user interface processing unit 110, a data processing unit 112, and a data storage unit 114. The user interface processing unit 110 receives an operational input from an operator and performs processing related to the user interface such as image display and audio output. The data processing unit 112 executes various processes on the basis of the data acquired by the user interface processing unit 110 and the data stored in the data storage unit 114. The data processing unit 112 also functions as an interface between the user interface processing unit 110 and the data storage unit 114. The data storage unit 114 stores various programs and setting data.

The user interface processing unit 110 includes an input unit 120 and an output unit 122. The input unit 120 receives an input from an operator via a hardware device such as a touch panel or a handle. The output unit 122 provides various types of information to an operator by image display or sound output. The output unit 122 may display a panel (keyboard and machine operation panel) on a screen.

The input unit 120 includes a mode selection unit 130, a spindle operation unit 132, a jog feed operation unit 134, and a pulse feed operation unit 136. The mode selection unit 130 receives an operational input or the like for switching between an automatic operation mode and a manual operation mode. For example, various operation modes such as a memory mode, an MDI mode, a jog mode, and a pulse mode are provided. The mode selection unit 130 includes selection keys for selecting each operation mode.

The "memory mode" is an automatic operation mode in which the machining device 2 is operated in accordance with a machining program stored in the data storage unit 114. The "MDI mode" is a mode in which a simple program command is manually input to operate the machining device 2. The "jog mode" is a manual operation mode in which the feedrate of the tool rest is adjusted by dial operation. The "pulse mode" is a manual operation mode in which the feedrate of the tool rest is adjusted by operating a manual pulse generator.

The spindle operation unit 132 receives an operational input for manually rotating the first spindle 20 and the second spindle 24. The spindle operation unit 132 includes, e.g., selection keys for selecting a target to be rotated among the first spindle 20 and the second spindle 24 and drive keys for rotating the target in a predetermined forward or reverse direction. The spindle operation unit 132 supplies a control command based on the operation conducted by an operator to a numerical control unit 140.

The jog feed operation unit 134 receives an operational input for moving the tool spindle 16 and the tool rest 18 in the jog mode. In the jog mode, either operation of jog feed or jog rapid traverse can be selected. In the "jog feed", the feedrate can be adjusted within a range of 0 to 655.34% of the rate set in advance by parameters for each axis. On the other hand, in the "jog rapid traverse," the rapid traverse rate can be adjusted within a range of 1 to 50%, with respect to the rapid traverse rate in automatic operation being assumed to be 100%.

The jog feed operation unit 134 includes selection keys for selecting either the tool spindle 16 or the tool rest 18 to be moved, and keys for selecting the feed direction among the X-axis +, X-axis −, Y-axis +, Y-axis −, Z-axis +, and Z-axis − directions. The jog feed operation unit 134 also includes a rapid traverse switch for selecting the jog rapid traverse operation. By turning on/off this rapid traverse switch in the jog mode, either jog rapid traverse or jog feed can be selected. The jog feed operation unit 134 further includes a dial for jog feed adjustment (also referred to as a "feed override switch") and a dial for jog rapid traverse adjustment (also referred to as a "rapid traverse override switch"), among others. The jog feed operation unit 134 supplies a control command based on the operation conducted by an operator to the numerical control unit 140.

The pulse feed operation unit 136 receives an operational input for moving the tool spindle 16 and the tool rest 18 in the pulse mode. The pulse feed operation unit 136 includes a pulse handle for generating a pulse signal and keys for selecting the feed direction among X-, Y-, and Z-axis directions. The pulse feed operation unit 136 supplies a control command based on the operation conducted by an operator to the numerical control unit 140.

The data processing unit 112 includes the numerical control unit 140 and a command unit 142. The numerical control unit 140 includes the functions of the NC 70. The numerical control unit 140 controls the machining device 2 in accordance with a machining program (NC program) stored in the data storage unit 114 on the basis of commands supplied from the input unit 120 and the command unit 142.

The numerical control unit 140 also sequentially transmits information (control information) indicating the current control state by the NC 70 to the command unit 142. The numerical control unit 140 transmits, e.g., a "rapid traverse in progress signal" when a rapid traverse is selected by automatic operation or manual operation and movement of the tool rest is started. In contrast, the numerical control unit 140 transmits a "normal feed in progress signal" when a feed other than rapid traverse is selected by automatic operation or manual operation and movement of the tool rest is started.

The command unit 142 includes the PLC 72 and functions as an "information processing device". The command unit 142 includes a state monitoring unit 150, a stop command unit 152, and a threshold value setting unit 154. The state monitoring unit 150 monitors the control state of the NC 70 on the basis of the control information received from the numerical control unit 140. When the vibration diagnostic amplifier 60 outputs a collision detection signal, the stop command unit 152 outputs a stop command to the numerical control unit 140. In response, the numerical control unit 140 stops the operation of the driving unit (feed drive unit or cutting driving unit) of the machining device 2. In addition, the output unit 122 outputs an alarm indicating the occurrence of a collision.

The acceleration sensor 40 and the vibration diagnostic amplifier 60 function as a "detection unit" for detecting a collision in the machine tool 1. In this embodiment, the vibration diagnostic amplifier 60 is independent of the control device 4, but may be incorporated as part of the control device 4.

The threshold value setting unit 154 changes the threshold value of acceleration for collision detection according to the control state by the NC 70. In other words, the threshold value setting unit 154 outputs an instruction to change the setting of the threshold value to the vibration diagnostic amplifier 60. The method of setting this threshold value will be described in detail below.

Figure 4:
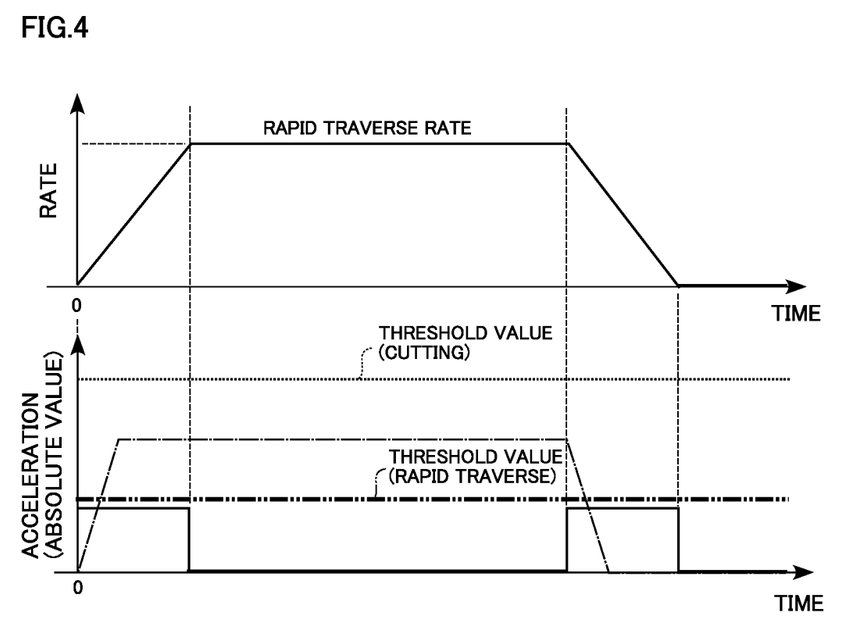
FIG. 4 is a chart schematically illustrating a method of setting the threshold value.

FIG. 4 is a chart schematically illustrating a method of setting the threshold value. The horizontal axis in this chart indicates the elapsed time from the start of the rapid traverse drive of the tool spindle. The vertical axis corresponds to the rate of the tool spindle in the upper graph and the acceleration of the tool spindle in the lower graph, the rate and the acceleration being indicated by solid lines. The dashed-double dotted line in the chart indicates a threshold value for collision determination in rapid traverse. For reference, the acceleration during cutting (the absolute value of vibration acceleration) is indicated by a dashed dotted line. The dotted line in the chart indicates threshold values for collision determination in cutting.

As shown, there is a predetermined time constant from the start of rapid traverse of the tool spindle to the time point at which the tool spindle reaches the set rate (a value set in advance as the rate for rapid traverse). The acceleration (absolute value) of the rapid traverse increases at the start and stop of the drive of the servomotor. If the threshold value of collision detection is smaller than this acceleration, a collision might be erroneously detected.

Therefore, the threshold value is set to be larger than a possible acceleration value (maximum acceleration) at the start and stop of the rapid traverse. In addition, even in the same rapid traverse, the rapid traverse in the manual operation mode operated by an operator has a lower rate and a smaller acceleration as compared with the rapid traverse in the automatic operation. On the other hand, since the cutting feed is accompanied by vibration due to contact between the tool and the workpiece, the acceleration detected in the cutting feed will be larger than that in the rapid traverse. Therefore, in this embodiment, the threshold values are set as follows according to operation states.

Figure 5:
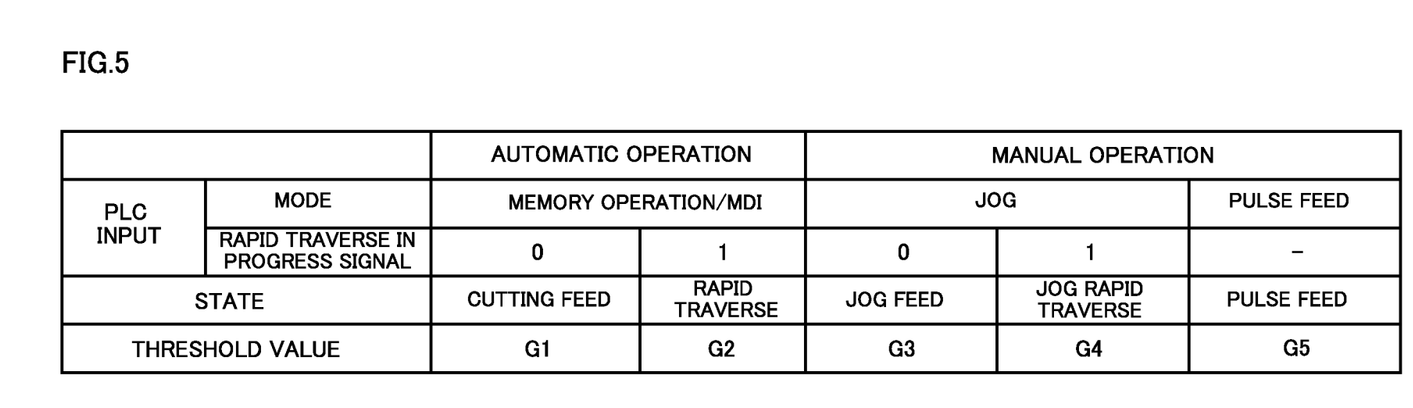
FIG. 5 is a table illustrating the relation between operating states and threshold values.

FIG. 5 is a table showing the relation between operating states and threshold values.

As shown in the table, the relation between operating states and threshold values is as follows. Whether rapid traverse is in progress is determined by whether a rapid traverse in progress signal "1" is input.

Threshold value G1: threshold value set for cutting feed (automatic operation mode)

Threshold value G2: threshold value set for rapid traverse (automatic operation mode)

Threshold value G3: threshold value set for jog feed (manual operation mode)

Threshold value G4: threshold value set for jog rapid traverse (manual operation mode)

Threshold value G5: threshold value set for pulse feed (manual operation mode)

Threshold value G6: threshold value set for a state which is neither cutting feed nor rapid traverse (automatic operation mode)

Here, G1 is larger than G2 (G1>G2). G1 and G2 may be fixed values. For example, the threshold value G1 may be set to "20 G (Gal)", and the threshold value G2 may be set to "5 G (Gal)". The threshold values G3 to G5 are calculated in accordance with the manual rate setting, and are generally lower than the threshold value G2. The threshold value G6 is a preliminary threshold value for setting a state that is neither a cutting feed nor a rapid traverse (not shown). The threshold value G6 may be set to, e.g., the same value as the threshold value G1 in the initial setting and may be changed as appropriate. In the present embodiment, the cutting control state includes cutting feed (automatic operation mode) and jog feed (manual operation mode), and the non-cutting control state includes the other rapid traverse (automatic operation mode), jog rapid traverse (manual operation mode), and pulse feed (manual operation mode). Therefore, in this embodiment, the threshold values G1 and G3 correspond to the "first threshold value", and the threshold values G2, G4, and G5 correspond to the "second threshold value". The threshold value G2 corresponds to the "third threshold value" and the threshold value G4 corresponds to the "fourth threshold value". However, the present invention is not limited to the above. For example, only the threshold value G1 may correspond to the "first threshold value" and only the threshold value G2 may correspond to the "second threshold value".

It should be noted that the first to fourth threshold values are concepts for specifying the magnitude correlation among the threshold values. Therefore, the concept of the "second threshold value" set in the feed control in the non-cutting control state may include the "third threshold value" set when the feed control in the non-cutting control state corresponds to the automatic operation mode, and the "fourth threshold value" set when the feed control in the non-cutting control state corresponds to the manual operation mode.

In this embodiment, the threshold value set in the feed control in the non-cutting control state is basically lower than the threshold value set in the cutting control state (the second threshold value <the first threshold value). More specifically, regarding a threshold set in the feed control in the non-cutting control state (the second threshold), a difference is provided between the automatic operation mode and the manual operation mode, so that the threshold value set for the manual operation mode is lower than the threshold value set for the automatic operation mode (the fourth threshold value<the third threshold value). In other words, the third threshold value and the fourth threshold value can be regarded as sub-concepts included in the "second threshold value" and represent a difference in threshold value setting according to the operation mode in a specific situation (during feed control in the non-cutting control state).

In the jog mode, the feedrate is set by an operator operating the feed override switch in the case of jog feed and the rapid traverse override switch in the case of jog rapid traverse. The numerical control unit 140 sets and changes the feedrate of the tool spindle according to the setting of the override by the operator. The higher the override, the higher the feedrate and the larger the acceleration at the start of the movement. In pulse feeding, an operator sets the feedrate by setting the magnification. The larger the set magnification, the higher the feedrate and the larger the acceleration at the start of the movement. The numerical control unit 140 sets and changes the feedrate of the tool spindle according to the magnification set by the operator. As described above, in both modes, the feedrate and thus the acceleration of the tool spindle are changed by the setting set by an operator, and the maximum acceleration can be calculated on the basis of the setting.

In the automatic operation mode as well, each feedrate can be adjusted by operating the feed override switch in the case of cutting feed and the rapid traverse override switch in the case of rapid traverse. The override in the automatic operation mode is similar to the jog mode in that the larger the value, the higher the feedrate, but the setting of the coefficient for the scale of the override switch is different from the jog mode. In the automatic operation mode, the scale (%) of the override switch directly corresponds to the coefficient. On the other hand, in the jog mode, the coefficient is set on the basis of the scale (%) of the override switch and the above-described parameter.

The threshold value setting unit 154 sets a value obtained by adding a margin value (margin) to the maximum acceleration in each operation mode as the threshold value. The margin value can be suitably set to, e.g., about 10% of the maximum acceleration. The vibration diagnostic amplifier 60 changes the setting of the threshold value every time the operation mode is changed. In other words, the threshold value setting unit 154 sets the threshold value according to the control state acquired by the state monitoring unit 150.

Figure 6:
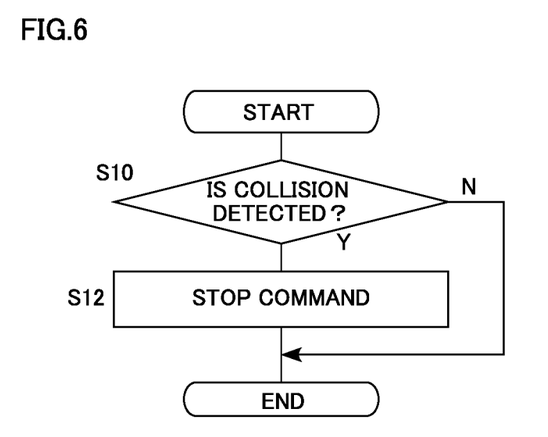
FIG. 6 is a flowchart illustrating a collision detection process.

FIG. 6 is a flowchart illustrating the collision detection process.

When a collision detection signal is output from the vibration diagnostic amplifier 60 (S10: Y), the stop command unit 152 outputs a stop command to the numerical control unit 140 (S12). As a result, the numerical control unit 140 stops the operation of the driving unit (feed drive unit and cutting driving unit) of the machining device 2. Thus, an operator can perform appropriate treatment (e.g., restoration work).

Figure 7:
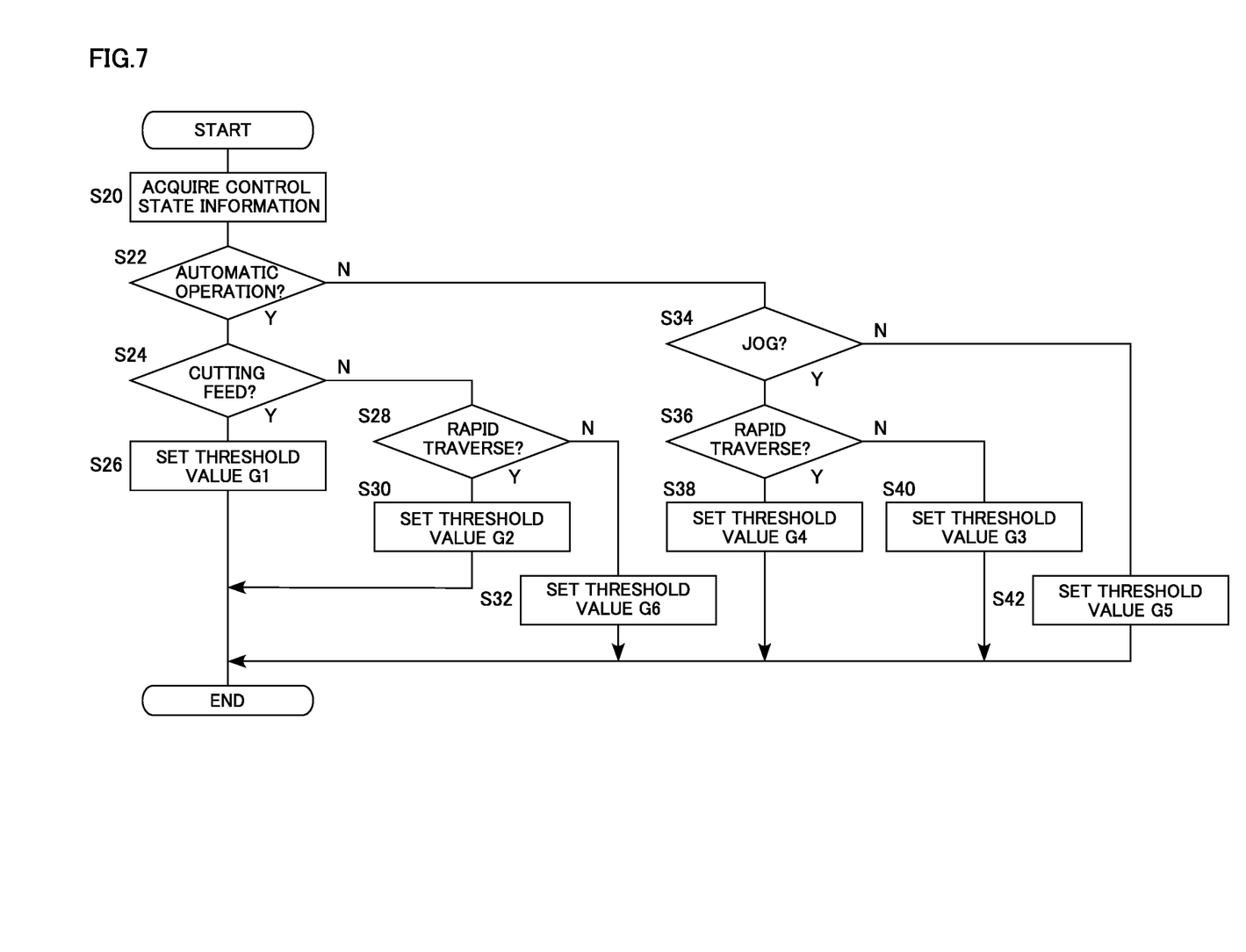
FIG. 7 is a flowchart illustrating a threshold value setting process.

FIG. 7 is a flowchart illustrating the threshold value setting process.

When a control state notification is issued by the numerical control unit 140, the state monitoring unit 150 acquires the notification (S20). At this time, if the control state is in the automatic operation mode (S22: Y) and the cutting feed is in progress (S24: Y), the threshold value setting unit 154 sets the threshold value G1 in the vibration diagnostic amplifier 60 (S26). On the other hand, if rapid traverse is in progress (S24: N, S28: Y), the threshold value G2 is set (S30). If neither cutting feed nor rapid traverse is in progress (S24: N, S28: N), the threshold value G6 is set (S32).

On the other hand, if the control state is the manual operation mode (S22: N) and the jog mode (S34: Y), the process proceeds to S36. At this time, if jog rapid traverse is in progress (S36: Y), the threshold value setting unit 154 sets the threshold value G4 in the vibration diagnostic amplifier 60 (S38). When jog feed is not in progress (S36: N), the threshold value G3 is set (S40). In the case of the pulse mode (S34: N), the threshold value G5 is set (S42). The threshold values G3 to G5 are calculated on the basis of the operation conducted by an operator as described above.

The machine tool 1 has been described above with reference to an embodiment.

In this embodiment, a collision of the movable body (spindle head 28, tool spindle 16) is detected on the basis of the detection by the acceleration sensor 40. Therefore, it is not necessary to change the threshold value in accordance with the weight change of the movable body as in the case of detecting a collision on the basis of the load torque of the feed drive unit. Further, appropriately setting and changing the threshold value in accordance with the control state will improve the accuracy of collision detection.

Specifically, during cutting, since the acceleration might be increased due to vibration transmitted to the tool, the relatively high first threshold is set. Therefore, it is possible to prevent that acceleration due to vibration generated during cutting feed is erroneously detected as acceleration due to a collision. Conversely, during non-cutting operation, because there is no vibration transmitted to the tool, the relatively low second threshold value is set. Thus, a collision occurred during rapid traverse can be detected without fail.

In addition, even in the same rapid traverse, an appropriate threshold value is set in accordance with the control mode such that the third threshold value is set in the automatic operation mode, the fourth threshold value is set in the manual operation mode, and the fourth threshold value is set lower than the third threshold value. Further, the threshold value is optimized according to the type of the manual operation mode by, e.g., setting the threshold value for each of the jog mode and the pulse mode. Therefore, the present embodiment enables appropriate detection of a collision of the movable body during the operation of the machine tool 1.

Modifications

In the above embodiment, the acceleration sensor 40 is incorporated in the spindle head 28. In a modification, the acceleration sensor 40 may be incorporated in the tool spindle 16 or the movable column 34. Alternatively, the acceleration sensor 40 may be mounted on the outer surface of the movable body instead of being incorporated in these movable bodies.

In the above embodiment, the spindle head 28 and the tool spindle 16 are exemplified as movable bodies for collision detection. In a modification, an acceleration sensor may be provided on the tool rest 18 or other movable body to perform collision detection in the same manner as in the above embodiment.

In the above embodiment, a configuration of a multitasking machine in which the spindle head 28 is rotated is presented. In a modification, the spindle head may not rotate, and an acceleration sensor may be provided on the spindle head. In the above embodiment, a turning center-based multitasking machine capable of milling and turning is exemplified as the machine tool 1. In a modification, the machine tool may be a machining center-based multitasking machine capable of milling and grinding. Alternatively, the machine tool may be a turning center or a machining center. An acceleration sensor may be provided on a movable body of these machine tools to perform collision detection as in the above embodiment.

In the above embodiment, a sensor for detecting acceleration in the directions of two axes of the X- and Y-axes is exemplified as the acceleration sensor 40. In a modification, the sensor may detect acceleration in the directions of two axes of the X- and Z-axes. The acceleration of the spindle head 28 (movable body) may be calculated on the basis of the composite vector of the accelerations of the two axes. Alternatively, a sensor for detecting acceleration in the directions of the three axes of the X-, Y- and Z-axes may be employed. The acceleration of the spindle head 28 (movable body) may be calculated on the basis of the composite vector of the accelerations of the three axes.

In the above embodiment, as shown in FIG. 4, the threshold value for acceleration at the time of rapid traverse is determined to be larger than the absolute value of positive acceleration and negative acceleration. Here, the acceleration actually involved in the collision is negative acceleration, i.e., deceleration. For this reason, when the acceleration sensor can distinguish positive acceleration and negative acceleration in detecting acceleration, the threshold value may be set on the basis of only negative acceleration (deceleration).

In the above embodiment, the threshold value setting is changed on the basis of the operational input made by an operator in the manual operation mode. In a modification, the threshold value may be set as a fixed value for each type of manual operation mode. Specifically, the threshold values G3 and G4 may be set by adding a margin value to the maximum acceleration (corresponding to the maximum value of the override) that can be reached in the jog feed and the jog rapid traverse, respectively. Similarly, the threshold value G5 may be set by adding a margin value to the maximum acceleration (corresponding to the maximum value of the magnification setting) that can be reached in the pulse mode.

The above embodiment exemplifies, with regard to the maintenance of the tool holding portion 30, a configuration in which the PLC 72 monitors a collision of the movable body. In a modification, the state monitoring unit may perform vibration monitoring, bearing monitoring, and unbalance monitoring, among others. The PLC 72 may output a stop command to the NC 70 when abnormal vibration is detected for a predetermined period of time or more (vibration monitoring). In other words, the command unit 142 may output a stop command to stop driving of the feed drive unit (servomotor) to the numerical control unit 140 when abnormal vibration occurring during the cutting feed is detected for a predetermined period of time or more on the basis of the output of the acceleration sensor 40.

With this configuration, in addition to the collision detection based on the setting of the threshold value as described above, vibration detection is performed in which vibration during cutting feed is monitored on the basis of the output of the acceleration sensor, and an abnormal vibration continuing for a predetermined period of time or longer is detected as an abnormality. That is, the entire machine tool can be stably managed by further detecting vibration even in a range not exceeding the first threshold value in the cutting control state.

The PLC 72 may also diagnose the state of the bearing of the tool holding portion 30 on the basis of the behavior of vibration (bearing monitoring). Furthermore, the PLC 72 may monitor the tool holding portion 30 while rotating the tool holding portion 30 without feed-driving, and may output a stop command to the NC 70 when abnormal vibration is detected (unbalance monitoring).

Although the vibration diagnostic amplifier 60 is provided integrally with the spindle head 28 (movable body) in the above embodiment, the vibration diagnostic amplifier 60 may be provided on a non-movable portion of the machining device 2, a control panel, or the like.

The present invention is not limited to the embodiment described above and modifications thereof, and any component thereof can be modified and embodied without departing from the scope of the invention. Components described in the embodiment and modifications can be combined as appropriate to form various embodiments. Some components may be omitted from the components presented in the embodiment and modifications.

CROSS REFERENCE TO RELATED APPLICATIONS

This application is a continuation application of International Application No. PCT/JP2021/031656, filed on Aug. 30, 2021, which claims priority to and the benefit of Japanese Patent Application No. 2020-147397, filed on Sep. 2, 2020. The contents of these applications are incorporated herein by reference in their entirety.

What is claimed is:
1. A machine tool comprising:
a processor including a numerical control unit and a command unit;
a movable body that supports a cutting tool configured to perform a machining operation;
a servomotor that feed-drives the movable body; and
an acceleration sensor that is provided on the movable body and detects acceleration of the movable body,
a vibration diagnostic amplifier amplifying an electric current signal detected by the acceleration sensor,
wherein the numerical control unit controls the feed drive by the servomotor to perform cutting by the cutting tool;
the command unit outputs a stop command to stop driving of the servomotor to the numerical control unit when the acceleration of the movable body exceeds a threshold value set in advance on the basis of an output of the vibration diagnostic amplifier,
wherein the acceleration of the movable body is calculated on the basis of composite vector of accelerations detected in multiple directions,
wherein the command unit sets a first threshold value as the threshold value in a cutting control state, and sets a second threshold value lower than the first threshold value as the threshold value in a feed control in a non-cutting control state,
wherein the vibration diagnostic amplifier stores the threshold values, and
wherein a vibration detection is further performed in which vibration during cutting feed is monitored on the basis of the output the acceleration sensor, and the command unit outputs a stop command for stopping the driving of the servomotor to the numerical control unit when the vibration of the movable body continues for at least a predetermined period of time during the cutting feed even in a range not exceeding the first threshold value set by the command unit.

2. The machine tool according to claim 1, further comprising:
a vibration diagnostic amplifier that is provided on the movable body, amplifies an electric current signal detected by the acceleration sensor, and determines whether the acceleration of the movable body exceeds the threshold value,
wherein the command unit outputs a stop command for stopping the driving of the servomotor to the numerical control unit when the acceleration of the movable body exceeds the threshold value in the determination by the vibration diagnostic amplifier based on the output of the acceleration sensor.

3. The machine tool according to claim 1, wherein an automatic operation mode and a manual operation mode are provided as control modes for the feed drive, and
wherein the command unit sets, as the second threshold value, a third threshold value when the feed control in the non-cutting control state corresponds to the automatic operation mode, and a fourth threshold value that is lower than the third threshold value when the feed control in the non-cutting control state corresponds to the manual operation mode.

4. The machine tool according to claim 3, wherein the processor further includes an input unit that receives an operational input made by an operator,
wherein, in the manual operation mode, the numerical control unit sets and changes the feedrate of the movable body according to the operational input made by the operator, and
wherein the command unit changes the setting of the fourth threshold value on the basis of the operational input made by the operator.

5. The machine tool according to claim 3, wherein the processor further includes an input unit that receives an operational input made by an operator,
wherein a plurality of modes selectable by an operator are provided as the manual operation mode, and
wherein the command unit changes the setting of the fourth threshold value according to the type of the manual operation mode selected by an operator.

6. An information processing device provided in a machine tool comprising:
a movable body that supports a cutting tool configured to perform a machining operation;
a servomotor that feed-drives the movable body; and
an acceleration sensor that detects acceleration of the movable body,
a vibration diagnostic amplifier amplifying an electric current signal detected by the acceleration sensor,
the information processing device comprising: a processor,
wherein the processor includes:
a numerical control unit that controls the feed drive by the servomotor to perform cutting by the cutting tool;
a state monitoring unit that monitors a control state of the numerical control unit;
a stop command unit that outputs a stop command to stop driving of a servomotor to the numerical control unit when an acceleration of the movable body exceeds a threshold value set in advance on a basis of an output of the vibration diagnostic amplifier; and
a threshold value setting unit that changes a setting of the threshold value according to the control state,
wherein the acceleration of the movable body is calculated on the basis of composite vector of accelerations detected in multiple directions,
wherein the threshold value setting unit sets a first threshold value as the threshold value in a cutting control state, and sets a second threshold value lower than the first threshold value as the threshold value in a feed control in a non-cutting control state,
wherein the vibration diagnostic amplifier stores the threshold values, and
wherein a vibration detection is further performed in which vibration during cutting feed is monitored on the basis of the output the acceleration sensor, and the command unit outputs a stop command for stopping the driving of the servomotor to the numerical control unit when the vibration of the movable body continues for at least a predetermined period of time during the cutting feed even in a range not exceeding the first threshold value set by the command unit.

\* \* \* \* \*